Aug. 14, 1956 L. J. MONCRIEFF 2,758,523
APPARATUS FOR MAKING TUBING
Filed Nov. 14, 1951
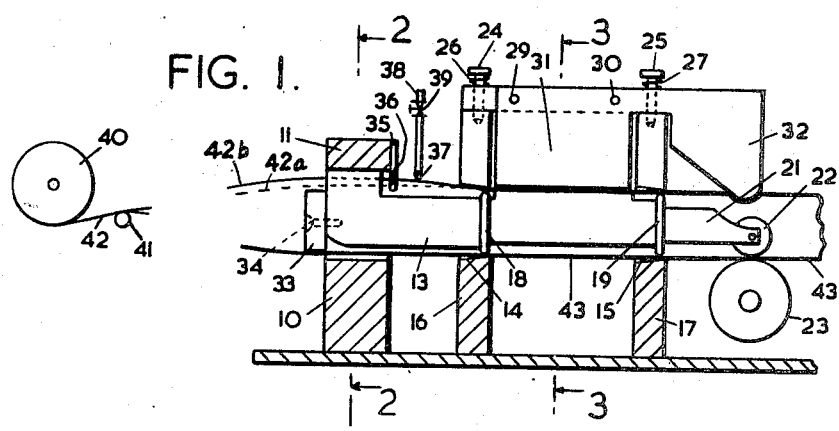
L. J. MONCRIEFF
INVENTOR
ATTORNEYS

United States Patent Office 2,758,523
Patented Aug. 14, 1956

2,758,523
APPARATUS FOR MAKING TUBING

Leslie John Moncrieff, London, England, assignor to British Celanese Limited, a corporation of Great Britain Application November 14, 1951, Serial No. 256,288

Claims priority, application Great Britain November 14, 1950

1 Claim. (Cl. 93—82)

This invention relates to tubes, and in particular to apparatus for making longitudinally seamed tubing continuously from strip material of cellulose acetate or other thermoplastic.

The principal object of the present invention is to provide an apparatus of simple construction and capable of making high quality tubing, even when tended by a relatively unskilled operator.

In the apparatus of the present invention a flat strip of the thermoplastic is drawn from a supply roll and, while travelling longitudinally, is bent transversely so that its edges overlap to the desired extent, by passage through two successive co-axial annular spaces, adhesive being applied to at least one of said edges before the first annular space is reached, the edges being kept apart during the application of the adhesive, the seam formed being pressed against a supporting surface over substantially the whole of the distance between the two annular spaces, and the strip being drawn through said annular spaces by the frictional force exerted by a surface of revolution which is caused to rotate about its axis while being urged against the outer surface of said tube, lateral movement and distortion of the tube under the pressure applied by said surface being resisted by another rotatable surface of revolution contacting the inner surface of the tube.

The apparatus of the invention comprises a mandrel having spaced along its length two circumferential expansions, and extending for at least most of the way between them a segmental expansion of the mandrel over a small arc to substantially the same radius as the circumferential expansions, two dies concentric with and near the circumferential expansions, for constraining strip of suitable width and thickness drawn through the two dies in turn to bend round the circumferential expansions with its edges overlapping along the segmental expansion, a pressing member resiliently mounted between said dies so as to press the seam formed by the overlapping edges against said segmental expansion, means for applying an adhesive to at least one of said edges behind the first die, means for keeping the edges apart until the adhesive has been applied, and a friction drive for drawing a strip through the dies, said drive comprising a driven friction wheel adapted to bear on the outside of the tube formed and an idler wheel rotatably mounted on the mandrel in such a position as to engage the inside of the tube and prevent distortion and lateral movement thereof under pressure applied by the driven wheel.

Preferably there is provided a fixed rigid tongue projecting into the path of the tube at a point diametrically opposite the point of contact of the driven friction wheel so as, by transversely bending the seam, to restrain any tendency of the overlapping edges of the seam to slip while the adhesive is setting.

In the tube-making machine of the present invention in its preferred form the mandrel, over the greater part of its length is of smaller cross-sectional area than that embraced by the tube so that the area of contact between the mandrel and the material is very small. The strip is bent to the desired cylindrical form by passage through two successive dies each having apertures flared so that the rearward internal diameter is slightly larger than the external diameter required in the tube while the forward internal diameter is the same as the said external diameter. The mandrel, of course, projects through these dies, being supported by its rearward end only from above so that the strip on its way to the dies can pass under the mandrel and be bent into a U-shape round it. On the mandrel where it passes through the dies are two circumferential ridges such that where the diameter of the die-apertures is at a minimum the diameter of the mandrel is at a maximum and is equal to the internal diameter of the tube. Thus each annular die space is defined by two stationary surfaces which are closer together in one particular transverse plane than in any other. Adhesive is applied to the portions of the strip that are to be overlapped just before the strip enters the first die. The radius of the mandrel between the dies is substantially less than the internal radius of the tube, but over a small arc just under the seam being formed the radius of the mandrel is equal to said internal radius. Thus, immediately under the seam the inside of the tube makes substantially line contact with the mandrel. The seam is prevented from opening by a presser, e. g., a spring-loaded vertical plate extending between the dies just above the seam on to which it presses, the vertical expansion of the section of the mandrel immediately below the seam preventing distortion of the tube by the pressure applied. On emerging from the second die the tube is gripped immediately below the seam between a driven roll engaging outside surface of tube and an idler roll journalled in the mandrel and engaging the inner surface of the tube. Immediately above the centre of the idler roll a depresser, which may be a tongue rigidly or resiliently attached to the second die and extending forwards and downwards, presses on the seam, causing an indentation from which the tube recovers as it progresses away from the die. This temporary indentation, extending to both thicknesses of the material at the overlap, restrains any tendency for the seam to open by slipping of one thickness over the other.

In starting up, the strip is first threaded through the apparatus, the two edges being overlapped from a point just behind the first die, the driving wheel is then set in operation and the adhesive is turned on. The first foot or two of the tube produced is apt to be defective owing to faulty adhesion. The advancing tube is therefore cut off until the tube emerging is satisfactory, slight adjustment in the flow of adhesive being made if necessary to achieve this result.

By means of apparatus of the kind described, cylindrical tubing of excellent appearance can be made, rapidly and continuously, to a predetermined diameter from strip material some 0.003 to 0.010″ in thickness. Preferably the thickness is from 0.003 to 0.008″, e. g. 0.005″. The diameter of the tubing made may range from half an inch or less to several inches.

Apart from its simplicity and effectiveness the apparatus of the invention has the advantage that it can be very simply adapted to produce tubing of other regular sections than circular, e. g. elliptical or regularly polygonal. This is done by fitting on to the mandrel a forward extension expanded to the desired shape, so that the cylindrical tubing as it is formed is pushed by the co-operating rolls over the expansion, heat being provided, e. g. by heating means within or surrounding the expansion, to soften the tube to the extent necessary for it to assume the desired shape. The periphery of the expansion should be very slightly greater than the internal periphery of the cylindrical tube.

Apparatus according to the invention is shown by way of example in the accompanying diagrammatic drawings wherein:

Fig. 1 is a part sectional elevation of a machine for producing tubing of circular cross-section;

Fig. 2 is a section along the line 2—2 of Fig. 1;

Fig. 3 is a section along the line 3—3 of Fig. 1;

Fig. 4 is a side part-sectional elevation showing the forward end of the mandrel of Fig. 1 fitted with an extension for making tubing of elliptical cross-section;

Fig. 5 is a plan view of the said extension of the mandrel;

Fig. 6 shows a detail view of Fig. 1 on a larger scale, and Fig. 7 shows a detail sectional elevation through the tongue on a larger scale.

Referring to Figs. 1 to 3: to a U-shaped support 10 is screwed a top-plate 11 to the undersurface of which is attached by screws 12 (one only of which is shown) a mandrel 13 which projects through the flared die apertures 14 and 15 in the dies 16 and 17. The two die apertures are identical in shape and dimensions. They are of circular cross-section the minimum diameter, which is at the forward end of each die, being equal to the external diameter required in the tube. The mandrel over the greater part of its length is of substantially smaller cross-section than the bore required in the tube. Where the die apertures are of minimum diameter, however, are two circumferential ridges 18 and 19 on the mandrel. In the vertical planes through these ridges the cross-section of the mandrel is truly circular and of the same diameter as the internal diameter required in the tube. Extending between the two circumferential ridges 18 and 19 is a segmental expansion of the mandrel the radius of the mandrel over a small arc 20 being the same as the internal radius required in the tube. A forward projection 21 of the mandrel is tapered and bifurcated to form a bearing for the rubber-covered idler roll 22 which is situated immediately above a driving roll 23 which is coupled to driving means (not shown). Mounted by screws 24 and 25 on the dies 16 and 17 and urged downwards by springs 26 and 27, is a bridge-piece 28 to which is attached by screws 29 and 30 a presser-plate 31 having an extension 32 in the form of a tongue extending forwards and downwards to a point immediately above the centres of the rolls 22 and 23 and to a distance from the centre line of the die apertures slightly less than their minimum radius.

A cylindrical felt pad 33 is attached by a screw 34 to the rear end of the mandrel and serves to minimise contact between the strip material and the mandrel until the ridge 18 is reached. From the forward end of the top-plate 11 depends a stationary separator guide 35 for holding the edges of the strip apart while adhesive is applied. This guide is in the form of a metal strip having a shoulder 36. Fig. 6 shows the way in which separator guide 35 operates to hold apart the edges 42a and 42b of the strip 42. Adhesive is applied from a wick 37 fed through a supply pipe 38 having a stopcock 39 and connected to a container not shown. The strip is contained in a roll 40 and is guided to the aperture between the U-shaped support 10 and the mandrel 13 by the guide roll 41.

Before starting, the bridge-piece 28 and its attachments are removed. The strip material 42 is then drawn by hand from the supply roll 40 over the guide roll 41 round the felt pad 33, through the U-shaped aperture between the support 10 and the mandrel 13, through the die apertures 14 and 15 and between the idler roll 22 and driving roll 23. In passing between the support 10 and the mandrel 13 it is, of course, bent into a U-shape. On reaching the separator guide 35 one edge 42a is bent further until held horizontal under the shoulder 36 and the other edge 42b is passed on the far side of the separator guide (see Fig. 6). The wick 37 is adjusted to apply adhesive to the bent-over edge of the strip emerging from under the shoulder 36. Between the two dies the two edges of the strip are overlapped so that the tube formed closely embraces the two ridges 18 and 19. The tube 43 so formed is held between the dies until the adhesive has set. The driving wheel 23 is then started and continues to draw the strip through the machine and to forward the tube produced. Once the machine has been started the bridge-piece 28 with its attachment is replaced and the screws 24 and 25 are tightened until the presser-plate 31 and the depresser tongue just prevent the seam 44 from opening. The tubing formed while these adjustments are being made is usually defective and is discarded. As indicated above, the depresser tongue forms slight temporary registering indentations in both layers of the seam, and these indentations help to prevent relative sideways movement of said layers while the adhesive is setting. Once in operation the machine has been found to run without needing further attention until the supply roll is nearly exhausted.

Referring now to Figs. 4 and 5, when tubing of elliptical cross-section is required the extension 45 is slipped on to the forward projecting portion of the mandrel upon which the stem portion 47 of the extension is a sliding fit, and is firmly attached by two counter-sunk screws 48 and 49. The idler pulley 22 is accommodated in the slot 50 of the extension 45. The contour of extension 45 gradually increases from the stem portion 47 to an oval section 51 the periphery of which is very slightly greater than the internal circumference of the tube 43. The tube is heated slightly to cause it to accommodate itself to the oval section of the mandrel. For simplicity the heating means are not shown. They may take various forms. The simplest arrangement is to surround the expanded portion of the extension 45 with an annular electric heating element. Alternatively the expanded portion of the extension may be bored to accommodate an electric heating element the leads of which pass from the extension into a passage extending the length of the mandrel and emerge at the rear end of the mandrel above the path of the strip material. A further alternative is to heat the expanded part of the extension by electromagnetic induction.

Similarly, other regular sections can be given to the circular tubing produced by the apparatus of Figs. 1 to 3 by employing extensions of the mandrel of appropriate form. In this way, for instance, tubes of square, hexagonal or octagonal section can be made.

It will be understood that all those parts of the apparatus with which the strip material or the tube comes into frictional contact must be highly polished or made of soft material, e. g. felt, to avoid scratching the strip or tube. Rigid parts making contact with the material or tube, e. g. the sides of the die apertures, the ridges or the mandrel, and the expanded part of the mandrel extension may be lubricated but this is generally unnecessary.

The method and apparatus of the invention are very suitable for making tubing from strip material of cellulose acetate made, for instance, by casting a solution of the cellulose acetate onto a travelling polished surface and evaporating the solvent. Other flexible materials having a basis of a thermoplastic polymer for which suitable adhesives can be found may, however, form the basis of the strip material used. Among these are other cellulose esters, e. g. the nitrate, propionate, butyrate, acetate-propionate, acetate-butyrate and acetate-stearate; cellulose ethers, e. g. ethyl cellulose and benzyl cellulose; polymerised vinyl and vinylidene compounds such as polystyrene, and copolymers of vinyl chloride with a minor proportion of vinyl acetate, of vinylidene chloride with a minor proportion of vinyl chloride and of vinyl or vinylidene chloride with acrylonitrile or methacrylonitrile; copolymers of ethylene; and rubber hydrochloride. Preferably the strip has a basis of an organic derivative of cellulose (i. e. an ester of a carboxylic acid or an ether) and especially an ester of a fatty acid containing 2 to 4 carbon atoms.

The formation of tubes of circular cross-section by the method of the invention is not dependent on the thermoplasticity of the strip material and certain polymers which are not truly thermoplastic in that they do not soften over a temperature range below their melting points or decomposition points can be used for this purpose. Such polymers include polyvinyl alcohol, regenerated cellulose, and highly crystalline polymers such as polyhexamethylene adipamide, polyethylene terephthalate, polyaminotriazole and like condensation polymers.

The adhesive used may be simply a volatile solvent for the film-forming base of the strip material. For cellulose acetate and other acetone-soluble materials acetone is very suitable. Instead of a volatile solvent alone a solution, e. g. a 5 to 10% solution, of the film-forming base in a volatile solvent can be used. When the strip material is not soluble in any volatile solvent a solution of another film-forming material that adheres to the strip material, in a volatile solvent, can be used. Solutions of polyvinyl acetate and of copolymers of vinyl acetate, in acetone may be used with many materials.

An important use for tubing made according to the invention is for cutting up to form transparent container bodies for the display and sale of small articles.

Having described my invention, what I desire to secure by Letters Patent is:

Apparatus for forming flexible strip material into longitudinally seamed tubing, which comprises a mandrel having spaced along its length two circumferential ridges, and extending for at least most of the way between them a segmental expansion of the mandrel over a small arc to substantially the same radius as the circumferential ridges, two dies concentric with and near the circumferential ridges for constraining strip of suitable width and thickness drawn through the two dies in turn to bend round the circumferential ridges with its edges overlapping along the segmental expansion, a pressing member resiliently mounted between said dies so as to press the seam formed by the overlapping edges against said segmental expansion, means for applying an adhesive to at least one of said edges behind the first die, means for keeping the edges apart until the adhesive has been applied, a friction drive for drawing a strip through the dies, said drive comprising a driven friction wheel adapted to bear on the outside of the tube formed and an idler-wheel rotatably mounted on the mandrel in such a position as to engage the inside of the tube and prevent distortion and lateral movement thereof under pressure applied by the driven wheel, and a rigid depresser projecting into the path of the tube at a point diametrically opposite the point of contact of the driven friction wheel so as, by temporarily indenting the seam, to restrain any tendency of the overlapping edges of the seam to slip while the adhesive is setting.

References Cited in the file of this patent

UNITED STATES PATENTS

| | | |
|---|---|---|
| 2,105,273 | Smith | Jan. 11, 1938 |
| 2,145,636 | Scharf | Jan. 31, 1939 |
| 2,173,859 | Piperoux | Sept. 26, 1939 |
| 2,200,971 | Sonneborn et al. | May 14, 1940 |
| 2,256,263 | Haycock | Sept. 16, 1941 |
| 2,286,529 | Young | June 16, 1942 |
| 2,390,120 | Peters | Dec. 4, 1945 |
| 2,509,715 | Allen et al. | May 30, 1950 |
| 2,580,665 | Dunning et al. | Jan. 1, 1950 |
| 2,587,211 | Piazze | Feb. 26, 1952 |
| 2,660,219 | Haas | Nov. 24, 1953 |